(12) United States Patent
Maharia

(10) Patent No.: US 11,489,767 B1
(45) Date of Patent: Nov. 1, 2022

(54) INTERSPERSING NETWORK TRAFFIC ACROSS MEMBERS OF A CONTAINER LABEL-SWITCHED PATH

(71) Applicant: Juniper Networks, Inc., Sunnyvale, CA (US)

(72) Inventor: Rashmi Maharia, Sikar (IN)

(73) Assignee: Juniper Networks, Inc., Sunnyvale, CA (US)

( * ) Notice: Subject to any disclaimer, the term of this patent is extended or adjusted under 35 U.S.C. 154(b) by 156 days.

(21) Appl. No.: 16/996,493

(22) Filed: Aug. 18, 2020

(51) Int. Cl.
| | |
|---|---|
| *H04L 45/00* | (2022.01) |
| *H04L 45/50* | (2022.01) |
| *H04L 45/74* | (2022.01) |
| *H04L 45/24* | (2022.01) |

(52) U.S. Cl.
CPC ............. *H04L 45/38* (2013.01); *H04L 45/22* (2013.01); *H04L 45/24* (2013.01); *H04L 45/50* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 7,936,783 B1 | 5/2011 | Bharali et al. | |
| 8,085,794 B1 * | 12/2011 | Niver | H04L 45/54 370/401 |
| 8,787,400 B1 | 7/2014 | Barth et al. | |
| 9,306,831 B2 | 4/2016 | Vasseur | |
| 10,412,005 B2 * | 9/2019 | Bao | H04L 43/16 |
| 10,693,679 B2 * | 6/2020 | Lin | H04L 45/66 |
| 2012/0321315 A1 * | 12/2012 | Timm | H04Q 11/0067 398/67 |
| 2014/0280708 A1 * | 9/2014 | Maltz | H04L 45/24 709/217 |
| 2015/0043331 A1 * | 2/2015 | Hu | H04L 47/34 370/228 |

* cited by examiner

*Primary Examiner* — Xavier S Wong

(74) *Attorney, Agent, or Firm* — Harrity & Harrity, LLP

(57) ABSTRACT

A network device may define a container LSP that includes multiple member LSPs. Each of the multiple member LSPs defines a path from the network device through a network of a plurality of network devices. The network device may receive traffic that includes multiple packet flows. The network device may identify a first set of packet flows that are intolerant to packet reordering. The network device may identify a second set of packet flows that are tolerant to packet reordering. The network device may distribute each of the first set of packet flows to a corresponding one of the multiple member LSPs. The network device may process the second set of packet flows to determine a distribution sequence for the second set of packet flows. The network device may distribute the second set of packet flows among the multiple member LSPs based on the distribution sequence.

20 Claims, 9 Drawing Sheets

INTERSPERSING NETWORK TRAFFIC ACROSS MEMBERS OF A CONTAINER LABEL-SWITCHED PATH

BACKGROUND

Resource reservation protocol-traffic engineering (RSVP-TE) allows bundling multiple child and/or member label-switched paths (LSPs) within a single parent path, which is known as a container LSP (e.g., a multiprotocol label switching (MPLS) tunnel).

SUMMARY

In some implementations, a method includes defining, by a network device, a container label-switched path (LSP) that includes multiple member LSPs, wherein each of the multiple member LSPs defines a path from the network device through a network of a plurality of network devices; receiving, by the network device, traffic that includes multiple packet flows; identifying, by the network device, a first set of packet flows, of the multiple packet flows, that are intolerant to packet reordering; identifying, by the network device, a second set of packet flows, of the multiple packet flows, that are tolerant to packet reordering; distributing, by the network device, each of the first set of packet flows to a corresponding one of the multiple member LSPs of the container LSP; processing, by the network device, the second set of packet flows, with a model, to determine a distribution sequence for the second set of packet flows; and distributing, by the network device, the second set of packet flows among the multiple member LSPs of the container LSP based on the distribution sequence.

In some implementations, a network device includes one or more memories and one or more processors configured to: define a container LSP that includes multiple member LSPs, wherein each of the multiple member LSPs defines a path from the network device through a network of a plurality of network devices; receive traffic that includes multiple packet flows; analyze headers of the multiple packet flows; identify a first set of packet flows, of the multiple packet flows, that are intolerant to packet reordering based on analyzing the headers of the multiple packet flows; identify a second set of packet flows, of the multiple packet flows, that are tolerant to packet reordering based on analyzing the headers of the multiple packet flows; distribute each of the first set of packet flows to a corresponding one of the multiple member LSPs of the container LSP; process the second set of packet flows, with a model, to determine a distribution sequence for the second set of packet flows; and distribute the second set of packet flows among the multiple member LSPs of the container LSP based on the distribution sequence.

In some implementations, a non-transitory computer-readable medium storing instructions includes one or more instructions that, when executed by one or more processors of a network device, cause the one or more processors to: define a container LSP that includes multiple member LSPs, wherein each of the multiple member LSPs defines a path from the network device through a network of a plurality of network devices; receive traffic that includes multiple packet flows; identify a first set of packet flows, of the multiple packet flows, that are intolerant to packet reordering; identify a second set of packet flows, of the multiple packet flows, that are tolerant to packet reordering; distribute each of the first set of packet flows to a corresponding one of the multiple member LSPs of the container LSP; determine a linear vector based on bandwidths of the multiple member LSPs; normalize the linear vector to generate a normalized linear vector; determine a distribution vector based on the normalized linear vector; determine that an element of the distribution vector is greater than or equal to a normalized average packet length of the second set of packet flows; utilize the distribution vector to determine a distribution sequence when the element of the distribution vector is greater than or equal to the normalized average packet length; and distribute the second set of packet flows among the multiple member LSPs of the container LSP based on the distribution sequence.

DETAILED DESCRIPTION

Figure 1A:
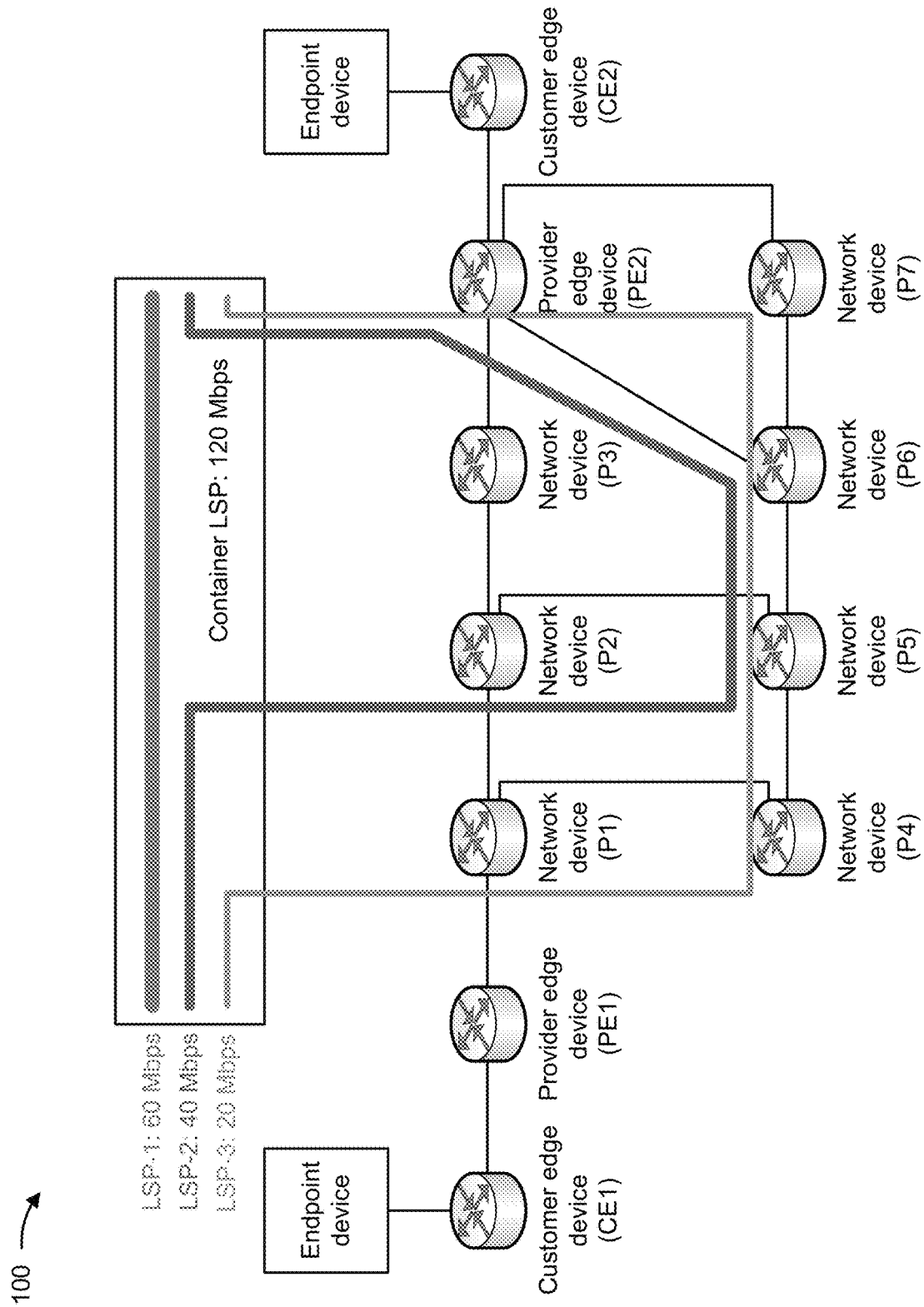
FIGS. 1A-1E are diagrams of one or more example implementations described herein.

The following detailed description of example implementations refers to the accompanying drawings. The same reference numbers in different drawings may identify the same or similar elements.

Resource reservation protocol-traffic engineering (RSVP-TE) allows bundling multiple child and/or member label-switched paths (LSPs) within a single parent path, which is known as a container LSP (e.g., a multiprotocol label switching (MPLS) tunnel). RSVP-TE is similar to a link aggregation group (LAG), where multiple physical interfaces are bundled together to form a single LAG interface.

Member LSPs are controlled by a dynamic LSP splitting and/or merging features. LSP splitting mechanism enables device to accommodate new aggregate demand on the container LSP by periodically creating new member LSPs or to re-signal existing LSPs with different bandwidths. Similarly, LSP merging enables it to respond to overall reduction in aggregate bandwidth, resulting in some LSPs being under-utilized, by dynamically eliminating some member of the container LSP. A distribution scheme (e.g., a hash-based method, a round robin method, a weighted round robin method, and/or the like) is enabled on an ingress network device label edge router (LER). The ingress network device uses the distribution scheme to distribute incoming traffic across member LSPs. However, with the hash-based method, traffic is not perfectly distributed between member LSPs of a container LSP, traffic gets polarized along a path if a same hashing function is utilized at each hop along a path, in-order packet delivery is not guaranteed due to periodic normalization events, signaling overhead occurs, and/or the like. The round robin method and the weighted round robin method cause packet reordering even more so than the hash-based method. Thus, current distribution schemes waste computing resources (e.g., processing resources, memory resources, communication resources, and/or the like), networking resources, and/or the like associated with inefficiently processing traffic, increased signaling overhead in a network, increased processing of reordered packets, and/or the like.

Some implementations described herein relate to a network device that proportionately distributes network traffic across members of a container LSP. For example, the network device may define a container LSP that includes multiple member LSPs, wherein each of the multiple member LSPs defines a path from the network device through a network of a plurality of network devices. The network device may receive traffic that includes multiple packet flows, and may identify a first set of packet flows, of the multiple packet flows, that are intolerant to packet reordering. The network device may identify a second set of packet flows, of the multiple packet flows, that are tolerant to packet reordering, and may distribute each of the first set of packet flows to a corresponding one of the multiple member LSPs of the container LSP. The network device may process the second set of packet flows, with a model, to determine a distribution sequence for the second set of packet flows, and may distribute the second set of packet flows among the multiple member LSPs of the container LSP based on the distribution sequence.

In this way, the network device may proportionately distribute network traffic across members of a container LSP. For example, the network device may provide a hybrid load balancing scheme to proportionately distribute network traffic across members of a container LSP. The customer would have flexibility to choose Hybrid, Hash, Round Robin, Weighted Round Robin, and/or the like to perform load balancing of network traffic based on link utilization, traffic type, hash polarization, LSP scale, auto-bandwidth adjustment frequency, signaling overhead, monitoring overhead, packet ordering, and/or the like. Proportionately distributing network traffic across members of a container LSP conserves computing resources (e.g., processing resources, memory resources, communication resources, and/or the like), networking resources, and/or the like that would otherwise have been wasted in inefficiently processing traffic, increasing signaling overhead in a network, increasing processing of reordered packets, and/or the like.

FIGS. 1A-1E are diagrams of one or more example implementations 100 described herein. As shown in FIGS. 1A-1E, the one or more example implementation(s) 100 include endpoint devices connected to a network that includes multiple customer edge devices (shown as CE1 and CE2), and multiple provider edge devices (shown as PE1 and PE2) that are connected via multiple network devices (shown as P1-P7). While some implementations are described herein in the context of a single endpoint device attached to a single customer edge device attached to a single provider edge device, in practice, these implementations apply to a plurality of endpoint devices connected to a plurality of customer edge devices that are each connected to one or more provider edge devices. In practice, the network may include tens, hundreds, thousands, or more customer edge devices and/or tens, hundreds, thousands, or more provider edge devices, and/or there may be hundreds, thousands, millions, or more endpoint devices connected to the network.

A customer edge device may include one or more network devices capable of processing and transferring network traffic. For example, the customer edge device may include a router, a gateway, a switch, a firewall, a hub, a bridge, a reverse proxy, a server (e.g., a proxy server, a server executing a virtual machine, and/or the like), a security device, an intrusion detection device, a load balancer, a line card (e.g., in a chassis-based system), or a similar type of device. In some implementations, the customer edge device may be located on an edge of a customer premises, and may communicate with the provider edge device to gain access to a core network of a service provider (e.g., an Internet service provider). Additionally, or alternatively, the customer edge device may communicate with one or more endpoint devices via a local area network (LAN) to provide the one or more endpoint devices with access to the core network via the customer edge device and the provider edge device.

A provider edge device may include one or more network devices capable of processing and transferring network traffic. For example, the provider edge device may include a router, a gateway, a switch, a firewall, a hub, a bridge, a reverse proxy, a server (e.g., a proxy server, a server executing a virtual machine, and/or the like), a security device, an intrusion detection device, a load balancer, a line card (e.g., in a chassis-based system), or a similar type of device. In some implementations, the provider edge device may be located on an edge of a core network of a service provider, and may provide access to the core network. For example, the provider edge device may provide access, to the core network, to a customer edge device associated with a LAN of a customer. Additionally, or alternatively, the provider edge device may communicate with one or more other provider edge devices to permit communications between different customer edge devices.

In some implementations, the provider edge device (e.g., provider edge device PE1) is an ingress network device label edge router (LER). The provider edge device may define a container LSP that includes multiple member LSPs. A member LSP, of the multiple member LSPs, may define a path, through the network, from the provider edge device to another provider edge device, either directly or indirectly via one or more network devices.

As an example, as shown in FIG. 1A, the provider edge device PE1 may be an LER and may define a container LSP that includes a first member LSP-1, a second member LSP-2, and a third member LSP-3. As shown in FIG. 1A, the first member LSP-1 defines a path, through the network, from the provider edge device PE1 to the provider edge device PE2 that includes network devices P1-P3. The second member LSP-2 defines a path, through the network, from the provider edge device PE1 to the provider edge device PE2 that includes network device P1, network device P2, network device P5, and network device P6. The third member LSP-3 defines a path, through the network, from the provider edge device PE1 to the provider edge device PE2 that includes network device P1, network device P4, network device P5, network device P6, and network device P7.

In some implementations, the multiple member LSPs of the container LSP are each associated with a respective index value indicating an order associated with the multiple member LSPs. As an example, a first member LSP (e.g., LSP-1), of the multiple member LSPs, may be created or defined first, relative to the other member LSPs. The first member LSP may be associated with a first index value, a lowest index value, a highest index value, and/or the like based on being created or defined first relative to the other member LSPs. A second member LSP (e.g., LSP-2), of the multiple member LSPs, may be created or defined second, relative to the other member LSPs. The second member LSP may be associated with a second index value, a second lowest index value, a second highest index value, and/or the like based on the second member LSP being created or defined second relative to the other member LSPs.

In some implementations, the provider edge device PE1 distributes traffic based on the index values associated with the multiple member LSPs. As an example, LSP-1 may be associated with a lowest (or highest) index value, LSP-3 may be associated with a highest (or lowest) index value, and LSP-2 may be associated with an index value that is higher (or lower) than the index value associated with LSP-1 and is lower (or higher) than the index value associated with LSP-3. The provider edge device PE1 may distribute traffic first to LSP-1 based on LSP-1 being associated with the lowest index value, then to LSP-2 based on the LSP-2 being associated with an index value that is lower than the index value associated with LSP-3, and then to LSP-3 based on LSP-3 being associated with the highest index value.

In some implementations, the provider edge device PE1 performs a merging function. For example, the provider edge device PE1 may determine that an overall reduction in aggregate bandwidth results in a member LSP being underutilized. The provider edge device PE1 may perform the merging function to eliminate one or more member LSPs.

In some implementations, the provider edge device PE1 performs a splitting function. For example, the provider edge device PE1 may perform the splitting function to create one or more new member LSPs and/or to resignal existing member LSPs with different bandwidths accommodate new aggregate bandwidth demand on the container LSP.

The provider edge device PE1 may allocate each member LSP a portion of the bandwidth of the container LSP. In some implementations, a bandwidth of a member LSP, of the multiple member LSPs, is different from a bandwidth of one or more other member LSPs, of the multiple member LSPs. For example, as shown in FIG. 1A, LSP-1 has a bandwidth of 60 Mbps, LSP-2 has a bandwidth of 40 Mbps, and LSP-3 has a bandwidth of 20 Mbps. In some implementations, LSP-1 may be allocated a larger portion of bandwidth relative to LSP-2 and/or LSP-3 based on more bandwidth availability on the path associated with LSP-1, as compared to the path associated with LSP-2 and/or LSP-3. Alternatively, and/or additionally, the bandwidth of the member LSP may be the same as the bandwidth of one or more other member LSPs.

Figure 1B:
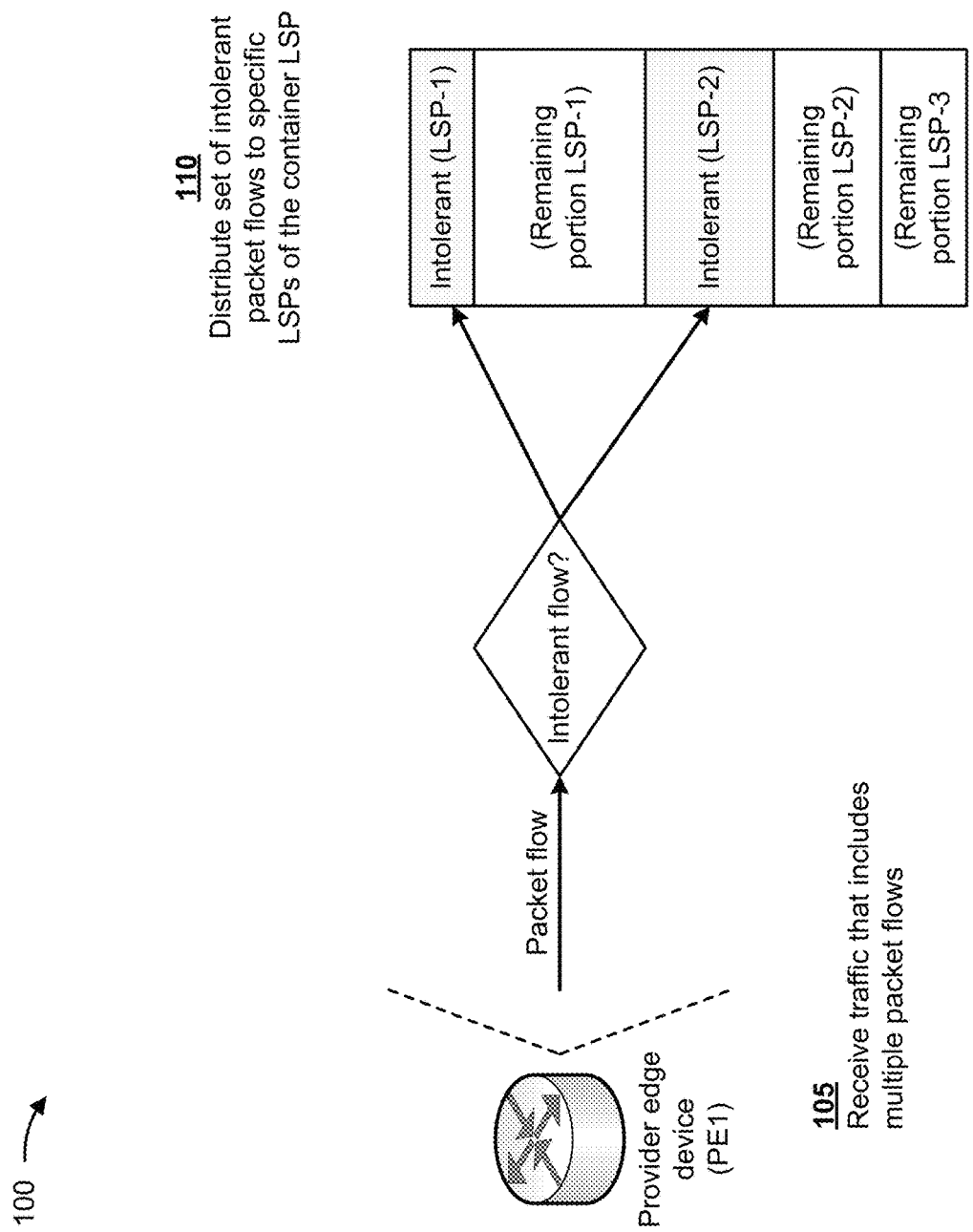

As shown in FIG. 1B, and by reference number 105, the provider edge device PE1 receives traffic that includes multiple packet flows. The provider edge device PE1 may analyze each packet flow, of the multiple packet flows. The provider edge device PE1 may identify a first set of packet flows, of the multiple packet flows, that are intolerant to reordering (e.g., a set of intolerant packet flows) and a second set of packet flows, of the multiple packet flows, that are tolerant to reordering (e.g., a set of tolerant packet flows) based on analyzing each packet.

As an example, the provider edge device PE1 may analyze a header of a packet flow, of the multiple packet flows. The provider edge device PE1 may determine that the packet flow is associated with data that is required to be received at the provider edge device PE2 in the same order in which it is transmitted from the provider edge device PE1. For example, provider edge device PE1 may determine that the packet flow is associated with a voice call.

The provider edge device PE1 may determine that the packet flow is an intolerant packet flow based on the packet flow being associated with data that is required to be received at the provider edge device PE2 in the same order in which it is transmitted from the provider edge device PE1.

The provider edge device PE1 may determine that another packet flow, of the multiple packet flows, is tolerant to reordering when the other packet flow is not associated with data that is required to be received at the provider edge device PE2 in the same order in which it is transmitted from the provider edge device PE1. The provider edge device PE1 may determine that the other packet flow is a tolerant packet flow based on the other packet flow not being associated with data that is required to be received at the provider edge device PE2 in the same order in which it is transmitted from the provider edge device PE1.

As shown by reference number 110, the provider edge device distributes the set of intolerant packet flows to specific member LSPs of the container LSP. In some implementations, the provider edge device PE1 distributes the intolerant packet flows based on the respective index values associated with the multiple member LSPs of the container LSP. For example, the provider edge device PE1 may distribute the intolerant packet flows starting with member LSPs associated with the lowest index values. As shown in FIG. 1B, the provider edge device PE1 distributes the intolerant packet flows to LSP-1 and LSP-2. Distributing the intolerant packet flows starting with the member LSPs associated with the lowest index values may prevent packet reordering for the intolerant packet flows, may prevent the intolerant packet flows from being split between two or more of the multiple member LSPs, and/or the like.

In some implementations, the provider edge device PE1 distributes the intolerant packet flows based on a configuration setting. In some implementations, the configuration setting may be input by a user via a command line interface (CLI) provided by a user interface associated with the provider edge device PE1. The configuration setting may include information indicating a scope of the configuration setting, information indicating a distribution scheme for distributing the intolerant packet flows to the member LSPs, and/or the like. In some implementations, the distribution of the intolerant packet flows may be determined by another device, such as a path computation agent (PCA) that determines the distribution based on configuration parameters of a MPLS tunnel.

In some implementations, the provider edge device PE1 may pin the intolerant packet flows to the member LSPs to which they were distributed, to cause subsequent data associated with the intolerant packet flows to be distributed to the same member LSPs. By pinning the intolerant packet flows to the member LSPs to which they were distributed, the subsequent data may be distributed to member LSPs associated with the lowest index values. In this way, the provider edge device PE1 may prevent packet reordering and/or the subsequent data from being split between two or more of the multiple member LSPs.

The provider edge device PE1 may distribute the set of tolerant packet flows to a remaining portion of the member LSPs. The remaining portion of the member LSPs may be a portion of the member LSPs to which the set of intolerant packet flows were not distributed. For example, as shown in FIG. 1B, the remaining portion of the member LSPs includes a remaining portion of LSP-1, a remaining portion of LSP-2, and LSP-3.

In some implementations, the provider edge device PE1 distributes the set of tolerant packet flows based on a configuration setting. In some implementations, the configuration setting may be input by a user via a user interface associated with the provider edge device PE1. The configuration setting may include information indicating a scope of the configuration setting, information indicating a distribution scheme for distributing the set of tolerant packet flows to the remaining portion of the member LSPs, and/or the like.

The information indicating the scope of the configuration setting may include information indicating that the configuration setting is associated with the network (e.g., that the configuration setting is to be utilized by every provider edge device included in the network), information indicating that the configuration setting is associated with the provider edge device PE1 (e.g., that the configuration setting is to be utilized by the provider edge device PE1), information indicating that the configuration setting is associated with a particular container LSP (e.g., that the configuration setting is to be utilized by the provider edge device PE1 to distribute the set of tolerant packet flows to the particular container LSP), and/or the like.

The information indicating the distribution scheme may include information indicating a method for distributing the set of tolerant packet flows to the remaining portion of the member LSPs. In some implementations, information indicating the method for distributing the set of tolerant flows may include information indicating a hash-based distribution scheme. The provider edge device PE1 may determine a hash-based distribution algorithm associated with the hash-based distribution scheme. For example, the information indicating the hash-based distribution scheme may include information indicating the hash-based distribution algorithm and the provider edge device PE1 may determine the hash-based distribution algorithm based thereon.

The provider edge device PE1 may utilize the hash-based distribution algorithm to map a tolerant packet flow, of the set of tolerant packet flows, to a remaining portion of the member LSPs. For example, the provider edge device PE1 may utilize the hash-based distribution algorithm to generate a hash of a source IP address associated with the tolerant packet flow, a destination IP address associated with the tolerant packet flow, a source port associated with the tolerant packet flow, a destination port associated with the tolerant packet flow, a protocol type associated with the tolerant packet flow, and/or the like. The provider edge device PE1 may identify a member LSP associated with a range of hashes that includes the generated hash. The provider edge device may distribute the tolerant packet flow to a remaining portion of the member LSP based on the member LSP being associated with the range of hashes that includes the generated hash.

In some implementations, the information indicating the method for distributing the set of tolerant flows may include information indicating a round-robin distribution scheme. The provider edge device PE1 may determine an order for distributing the set of tolerant packet flows to the remaining portion of the member LSPs based on the round-robin distribution scheme. In some implementations, the provider edge device PE1 determines the order based on the index values associated with the remaining portions of the member LSPs. For example, the provider edge device PE1 may determine that the remaining portion of the LSP-1 is first in the order, based on LSP-1 being associated with a lowest index value relative to the index values associated with LSP-2 and LSP-3. The provider edge device PE1 may determine that the remaining portion of LSP-2 is second in the order, based on LSP-2 being associated with an index value that is lower than the index value associated with LSP-3. The provider edge device PE1 may determine that the remaining portion of LSP-3 is third in the order, based on LSP-3 being associated with the lowest index value relative to the index values associated with LSP-1 and LSP-2. The provider edge device PE1 may distribute the set of tolerant packet flows to the remaining portion of the member LSPs in a round-robin manner based on the order.

In some implementations, the information indicating the method for distributing the set of tolerant packet flows to the remaining portion of the member LSPs may include information indicating a hybrid distribution scheme. The hybrid distribution scheme may be a model that utilizes an interspersing algorithm to determine a distribution sequence for distributing the set of tolerant packet flows to the remaining portion of the member LSPs, as described in greater detail below.

Figure 1C:
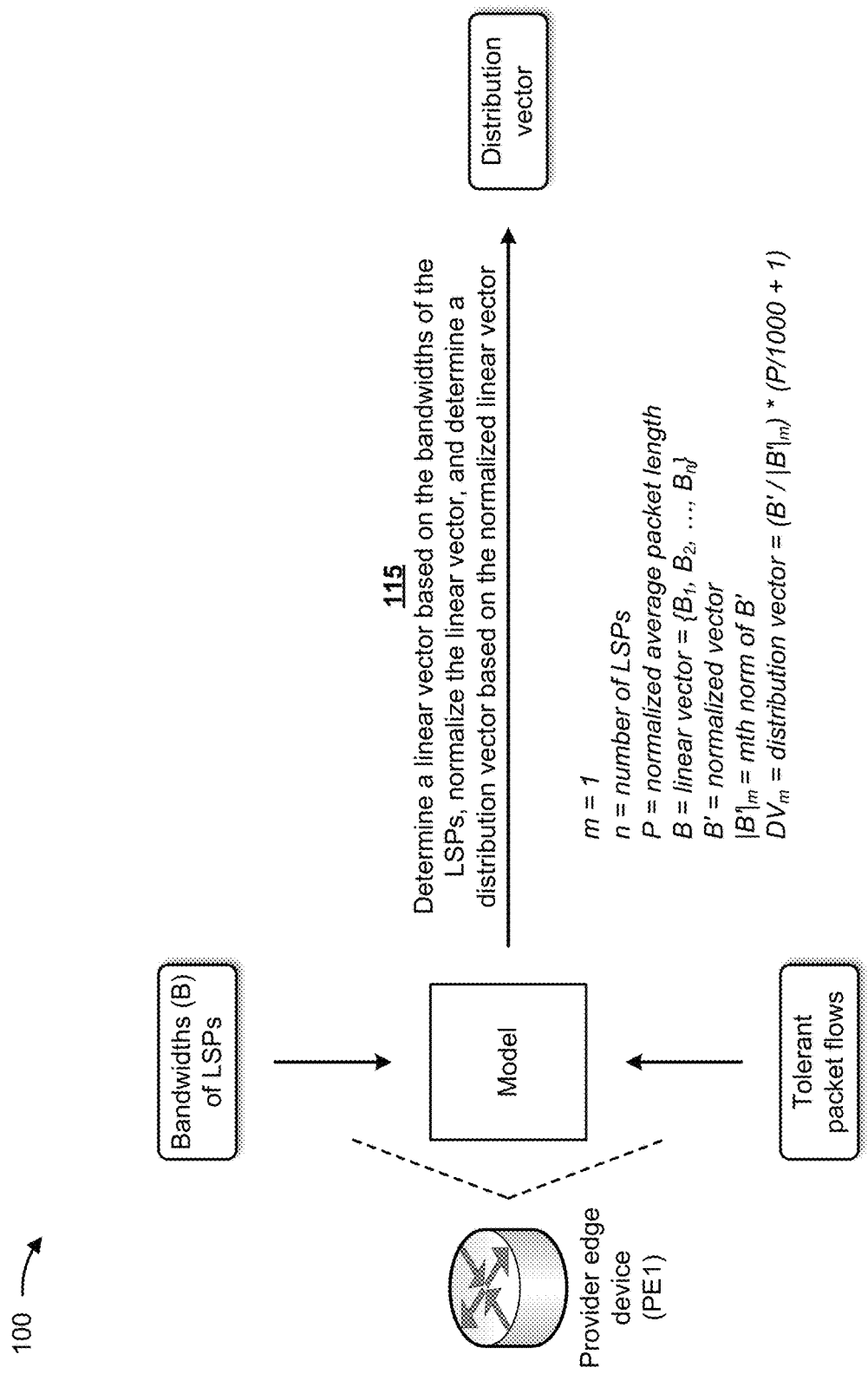

As shown in FIG. 1C, and by reference number 115, the provider edge device PE1 determines a linear vector based on the bandwidths of the member LSPs. In some implementations, the provider edge device PE1 determines the linear vector based on the bandwidth allocated to the member LSPs. For example, as discussed above with respect to FIG. 1A, the provider edge device allocates 60 Mbps to LPS-1, 40 Mbps to LPS-2, and 20 Mbps to LPS-3. Based on these allocations, the provider edge device PE1 may determine the linear vector (B) as {60, 40, 20}.

As also shown by reference number 115, the provider edge device PE1 normalizes the linear vector. The provider edge device PE1 may normalize the linear vector to generate a normalized linear vector (B'). The provider edge device PE1 may normalize the linear vector by dividing each element by the highest common factor. For example, the provider edge device may normalize the linear vector (B) {60, 40, 20} by dividing each element by the highest common factor of 20 to determine the normalized linear vector (B') {3, 2, 1}.

As also shown by reference number 115, the provider edge device PE1 determines a distribution vector based on the normalized linear vector. The provider edge device PE1 may determine an average packet length associated with the container LSP. For example, the provider edge device PE1 may determine an average packet length of packets transmitted via the container LSP during previous adjustment interval, a period of time prior to receiving the traffic including the multiple packet flows, an average packet length of packets transmitted through the network via provider edge device PE1, an average packet length of all packets transmitted through the network, and/or the like. The provider edge device PE1 may determine a normalized average packet length based on the average packet length.

The provider edge device PE 1 may determine the distribution vector based on the normalized linear vector. The provider edge device PE1 may derive the $m^{th}$-norm distribution vector (DV) based on the normalized linear vector. The provider edge device PE1 may derive the $m^{th}$-norm distribution vector based on a first equation:

$$|B'|_m = \left(\sum_{i=1}^{n} |B'_i|^m\right)^{1/m}$$

where n is equal to the number of member LSPs of the container LSP. The provider edge device PE1 may determine the distribution vector (DV) based on a second equation:

$$DV = \left(\frac{B'}{|B'|_m}\right) X \left(\frac{P}{1000} + 1\right)$$

The provider edge device PE1 may start with the l'-norm distribution vector (e.g., m=1) and may continue incrementally deriving the $m^{th}$-norm distribution vector (e.g., m=2, m=3, . . . ) until an element of the distribution vector is greater than or equal to the normalized average packet length associated with the container LSP. By incrementally deriving the $m^{th}$-norm distribution vector until an element of the distribution vector is greater than or equal to the normalized average packet length, the provider edge device PE1 may ensure that the first member LSP (e.g., LSP-1) is able to transmit at least one packet.

Figure 1D:
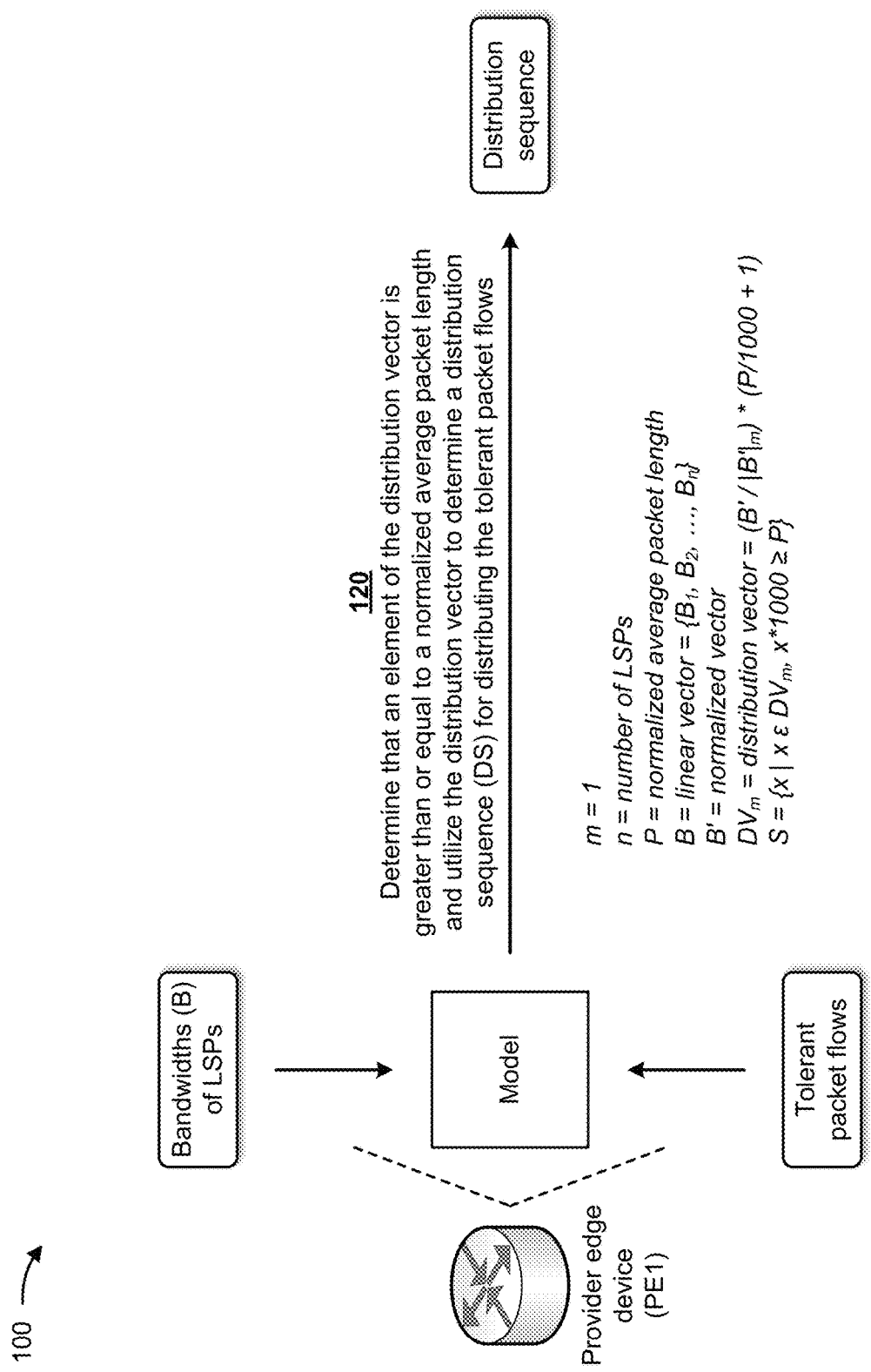

As shown in FIG. 1D, and by reference number 120, the provider edge device PE1 determines that an element of the distribution vector is greater than or equal to a normalized average packet length and utilizes the distribution vector to determine a distribution sequence (DS) for distributing the tolerant packet flows. In some implementations, the provider edge device PE1 utilizes the distribution vector to determine the DS based on a deficit round robin method. The deficit round robin method may include multiple rounds. For a round of the deficit round robin method, a member LSP may have a quantity of bytes corresponding to a value of an element of the distribution vector associated with the member LSP and a quantity of any unused bytes carried over from a previous round. The provider edge device PE1 may determine the distribution sequence based on a total quantity of bytes that each member LSP has for each round of the deficit round robin method.

Figure 1E:
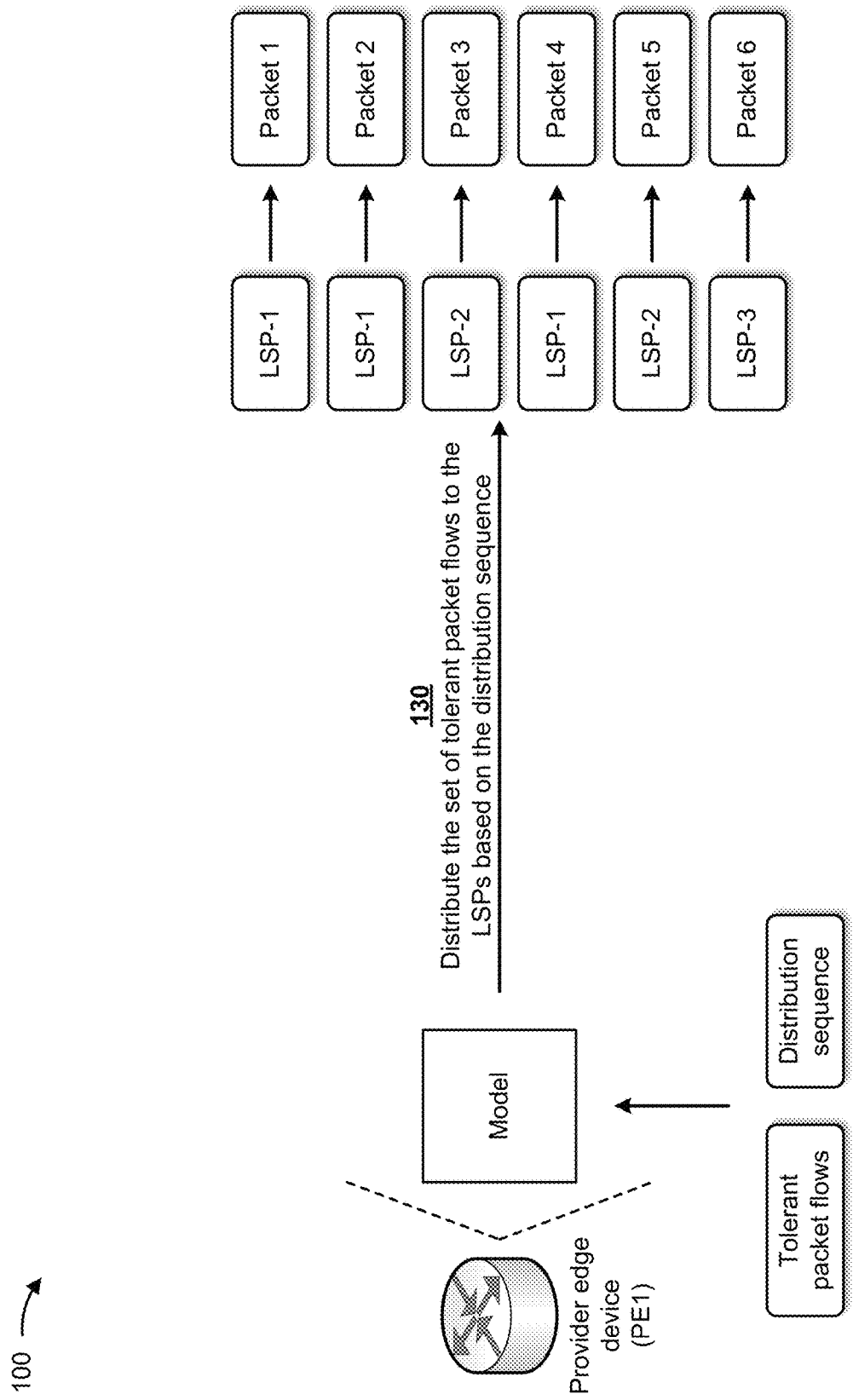

As shown in FIG. 1E, and by reference number 130, the provider edge device distributes the set of tolerant packet flows to the member LSPs based on the distribution sequence. In some implementations, the provider edge device may distribute the set of tolerant packet flows based on the deficit round robin method. As an example, assume that the container LSP includes three member LSPs (e.g., LSP-1, LSP-2, and LSP-3), that the provider edge device PE1 determines the distribution vector as {802, 535, 267}, and that the provider edge device PE1 determines that the normalized average packet length is 800 bytes. The provider edge device may determine that the distribution sequence is {LSP-1, LSP-1, LSP-2, LSP-1, LSP-2, LSP-3} based on the deficit round robin method, as explained below with respect to FIG. 1E.

In a first round of the deficit round robin method, the provider edge device may determine that 802 bytes may be distributed to a first member LSP (e.g., LSP-1), that 535 bytes may be distributed to a second member LSP (e.g., LSP-2), and that 267 bytes may be distributed to a third member LSP (e.g., LSP-3) based on the distribution vector. The provider edge device PE1 may distribute a first packet (e.g., 800 bytes) to the first member LSP based on the first member LSP having 802 bytes available for distribution. The provider edge device PE1 may not distribute a packet to the second member LSP or the third member LSP based on the second member LSP and the third member LSP having less than 800 bytes available for distribution.

In a second round, the provider edge device PE1 may determine that 804 bytes may be distributed to the first member LSP (e.g., two bytes remaining from the first round plus 802 bytes from the second round), that 1,070 bytes may be distributed to the second member LSP (e.g., 535 bytes from the first round plus 535 bytes from the second round), and that 534 bytes may be distributed to the third member LSP (e.g., 267 bytes from the first round and 267 bytes from the second round). The provider edge device PE1 may distribute 800 bytes to the first member LSP based on the first member LSP having 804 bytes available for distribution. The provider edge device PE1 may distribute 800 bytes to the second member LSP based on the second member LSP having 1,070 bytes available for distribution. The provider edge device PE1 may not distribute any bytes to the third member LSP based on the third member LSP having less than 800 bytes available for distribution.

In a third round, the provider edge device PE1 may determine that 806 bytes may be distributed to the first member LSP (e.g., four bytes remaining from the second round plus 802 bytes from the third round), that 805 bytes may be distributed to the second member LSP (e.g., 270 bytes from the second round plus 535 bytes from the third round), and that 801 bytes may be distributed to the third member LSP (e.g., 534 bytes from the second round and 267 bytes from the third round). The provider edge device PE1 may distribute 800 bytes to the first member LSP based on the first member LSP having 806 bytes available for distribution. The provider edge device PE1 may distribute 800 bytes to the second member LSP based on the second member LSP having 805 bytes available for distribution. The provider edge device PE1 may distribute 800 bytes to the third member LSP based on the second member LSP having 801 bytes available for distribution. The provider edge device PE1 may continue in a similar manner to distribute the set of tolerant packet flows to the remaining portion of the member LSPs.

Distributing the tolerant packet flows to the member LSPs based on the DS may prevent automatic bandwidth adjustments for the container LSP. By preventing the automatic bandwidth adjustments, the provider edge device PE1 may conserve computing resources that otherwise would have been utilized to perform the automatic bandwidth adjustments.

In some implementations, the provider edge device PE1 receives another set of intolerant packet flows. The provider edge device PE1 may distribute each intolerant packet flow, of the other set of intolerant packet flows, to a respective member LSP, of the multiple member LSPs of the container LSP, in a manner similar to that described above with respect to FIG. 1B. The provider edge device PE1 may reprocess the set of tolerant packet flows to determine another DS for the set of tolerant packet flows. In some implementations, the provider edge device PE1 may determine the remaining portion of the member LSPs based on distributing the other set of intolerant packet flows and may determine the other DS in a manner similar to that described above with respect to FIGS. 1C and 1D. The provider edge device PE1 may distribute the set of tolerant packet flows to the remaining portion of the member LSPs based on the other DS, in a manner similar to that described above with respect to FIG. 1E.

In this way, the provider edge device may proportionately distribute network traffic across members of a container LSP. Proportionately distributing network traffic across members of a container LSP conserves computing resources, networking resources, and/or the like that would otherwise have been wasted in inefficiently processing traffic, increasing signaling overhead in a network, increasing processing of reordered packets, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E. Further, the above described methods may be used for other applications that require demultiplexing of traffic, such as weighted Equal-Cost Multi-Path (ECMP).

Figure 2:
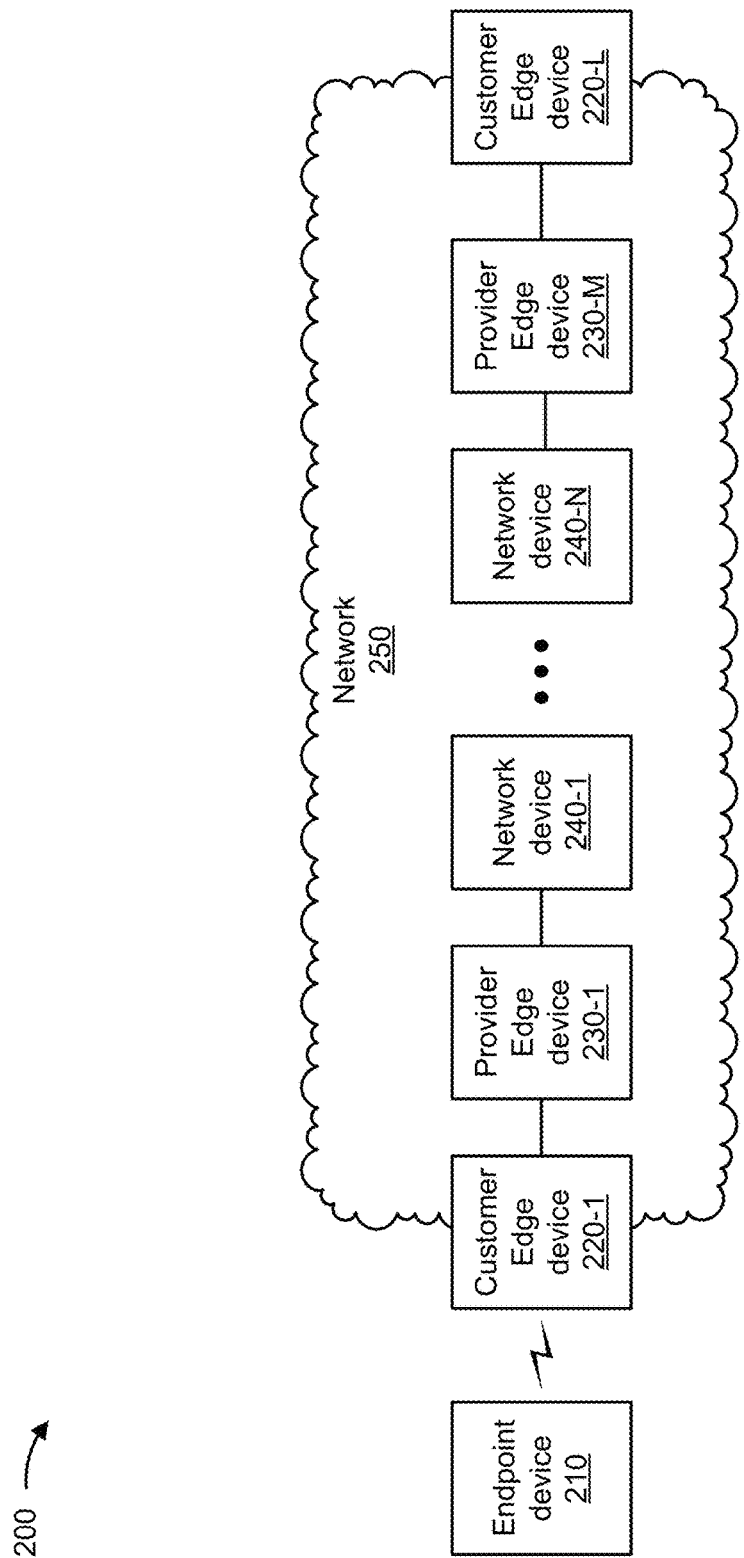
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, one or more customer edge devices 220-1 through 220-L (L≥1) (hereinafter referred to collectively as "customer edge devices 220," and individually as "customer edge device 220"), one or more provider edge devices 230-1 through 230-M (M≥1) (hereinafter referred to collectively as "provider edge devices 230," and individually as "provider edge device 230"), one or more network devices 240-1 through 240-N (hereinafter referred to collectively as "network devices 240," and individually as "network device 240"), and a network 250. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, or a similar type of device. In some implementations, endpoint device 210 may receive network traffic from and/or may provide network traffic to other endpoint devices 210 via network 250 (e.g., by routing packets using customer edge devices 220 and/or provider edge devices 230 as intermediaries).

Customer edge device 220 includes one or more devices (e.g., one or more traffic transfer devices) capable of processing and/or transferring traffic. For example, customer edge device 220 may include a firewall, a router, a gateway, a switch, a hub, a bridge, a reverse proxy, a server (e.g., a proxy server), a security device, an intrusion detection device, a load balancer, or a similar type of device. In some implementations, customer edge device 220 may be connected to provider edge device 230 via a link, a plurality of links, one or more groups of links, and/or the like. In some implementations, customer edge device 220 may transmit traffic to endpoint device 210 and/or provider edge device 230 and receive traffic from endpoint device 210 and/or provider edge device 230, as described elsewhere herein. In some implementations, customer edge device 220 may be a physical device implemented within a housing, such as a chassis. In some implementations, customer edge device 220 may be a virtual device implemented by one or more computer devices of a cloud computing environment or a data center.

Provider edge device 230 includes one or more devices capable of receiving, processing, storing, routing, and/or providing traffic (e.g., a packet, other information or metadata, and/or the like) in a manner described herein. For example, provider edge device 230 may include a router, such as a label switching router (LSR), a label edge router (LER), an ingress router, an egress router, a provider router (e.g., a provider edge router, a provider core router, and/or the like), a virtual router, and/or the like. Additionally, or alternatively, provider edge device 230 may include a gateway, a switch, a firewall, a hub, a bridge, a reverse proxy, a server (e.g., a proxy server, a cloud server, a data center server, and/or the like), a load balancer, and/or a similar device.

In some implementations, provider edge device 230 may receive traffic from customer edge device 220 and/or another provider edge device 230 and may transmit traffic to customer edge device 220 and/or another provider edge device 230, as described elsewhere herein. In some implementations, provider edge device 230 may be a physical device implemented within a housing, such as a chassis. In some implementations, provider edge device 230 may be a virtual device implemented by one or more computer devices of a cloud computing environment or a data center. In some implementations, a group of provider edge devices 230 may be a group of data center nodes that are used to route traffic flow through network 250.

Network device 240 includes one or more devices capable of receiving, processing, storing, routing, and/or providing traffic (e.g., a packet, other information or metadata, and/or the like) in a manner described herein. For example, network device 240 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 240 may include a gateway, a switch, a firewall, a hub, a bridge, a reverse proxy, a server (e.g., a proxy server, a cloud server, a data center server, and/or the like), a load balancer, and/or a similar device. In some implementations, network device 240 may be a physical device implemented within a housing, such as a chassis. In some implementations, network device 240 may be a virtual device implemented by one or more computing devices of a cloud computing environment or a data center. In some implementations, a group of network devices 240 may be a group of data center nodes that are used to route traffic flow through a network.

Network 250 includes one or more wired and/or wireless networks. For example, network 250 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
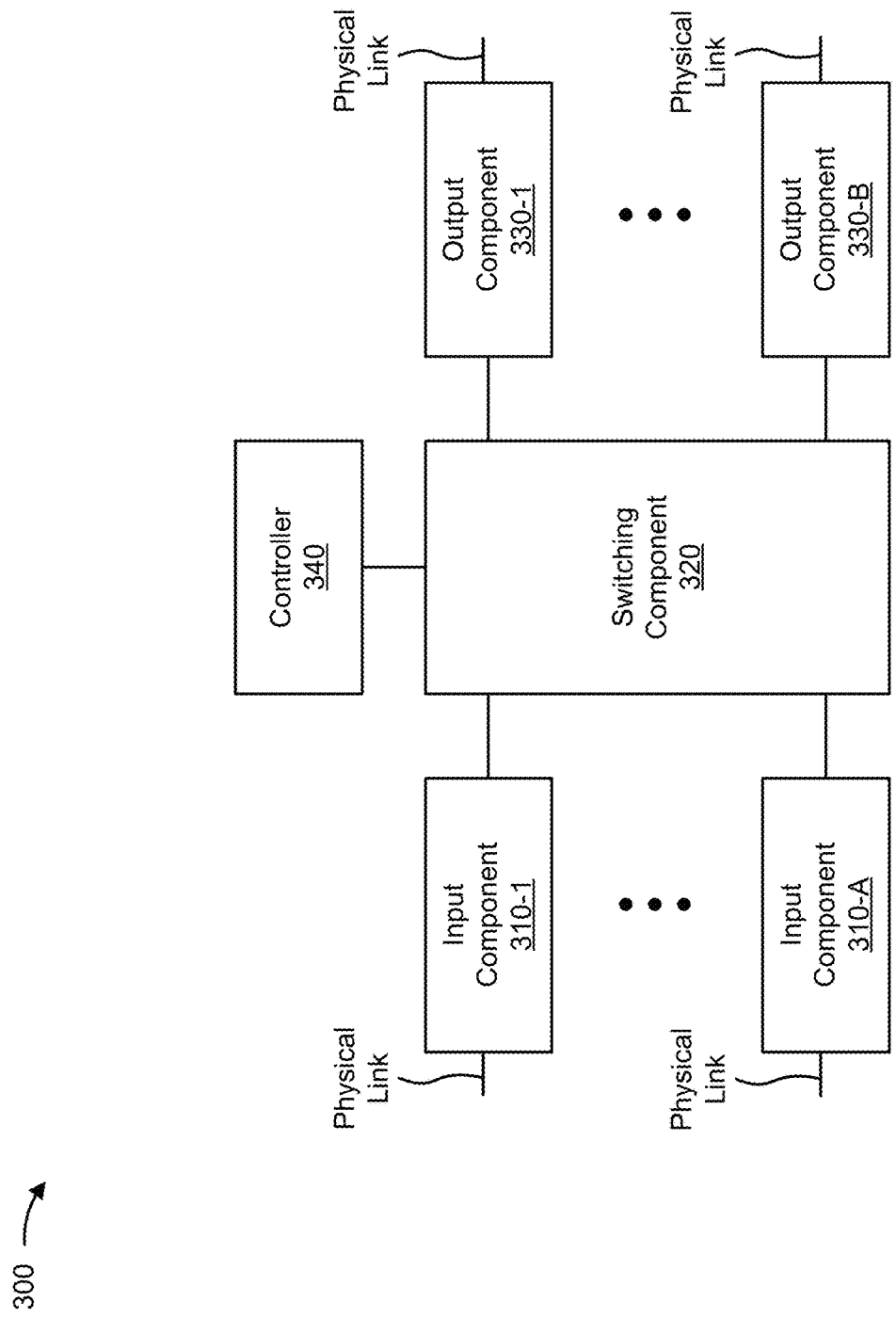
FIGS. 3 and 4 are diagrams of example components of one or more devices of FIG. 2.

FIG. 3 is a diagram of example components of a device 300. Device 300 may correspond to customer edge device 220, provider edge device 230, network device 240, and/or the like. In some implementations, customer edge device 220, provider edge device 230, network device 240, and/or the like may include one or more devices 300 and/or one or more components of device 300. As shown in FIG. 3, device 300 may include one or more input components 310-1 through 310-B (B≥1) (hereinafter referred to collectively as input components 310, and individually as input component 310), a switching component 320, one or more output components 330-1 through 330-C(C≥1) (hereinafter referred to collectively as output components 330, and individually as output component 330), and a controller 340.

Input component 310 may be one or more points of attachment for physical links and may be one or more points of entry for incoming traffic, such as packets. Input component 310 may process incoming traffic, such as by performing data link layer encapsulation or decapsulation. In some implementations, input component 310 may transmit and/or receive packets. In some implementations, input component 310 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 310.

Switching component 320 may interconnect input components 310 with output components 330. In some implementations, switching component 320 may be implemented via one or more crossbars, via busses, and/or with shared memories. The shared memories may act as temporary buffers to store packets from input components 310 before the packets are eventually scheduled for delivery to output components 330. In some implementations, switching component 320 may enable input components 310, output components 330, and/or controller 340 to communicate with one another.

Output component 330 may store packets and may schedule packets for transmission on output physical links. Output component 330 may support data link layer encapsulation or decapsulation, and/or a variety of higher-level protocols. In some implementations, output component 330 may transmit packets and/or receive packets. In some implementations, output component 330 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 330. In some implementations, input component 310 and output component 330 may be implemented by the same set of components (e.g., and input/output component may be a combination of input component 310 and output component 330).

Controller 340 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 340 may include one or more processors that can be programmed to perform a function.

In some implementations, controller 340 may include a RAM, a ROM, and/or another type of dynamic or static storage device (e.g., a flash memory, a magnetic memory, an optical memory, etc.) that stores information and/or instructions for use by controller 340.

In some implementations, controller 340 may communicate with other devices, networks, and/or systems connected to device 300 to exchange information regarding network topology. Controller 340 may create routing tables based on the network topology information, may create forwarding tables based on the routing tables, and may forward the forwarding tables to input components 310 and/or output components 330. Input components 310 and/or output components 330 may use the forwarding tables to perform route lookups for incoming and/or outgoing packets.

Controller 340 may perform one or more processes described herein. Controller 340 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 340 from another computer-readable medium or from another device via a communication interface. When executed, software instructions stored in a memory and/or storage component associated with controller 340 may cause controller 340 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
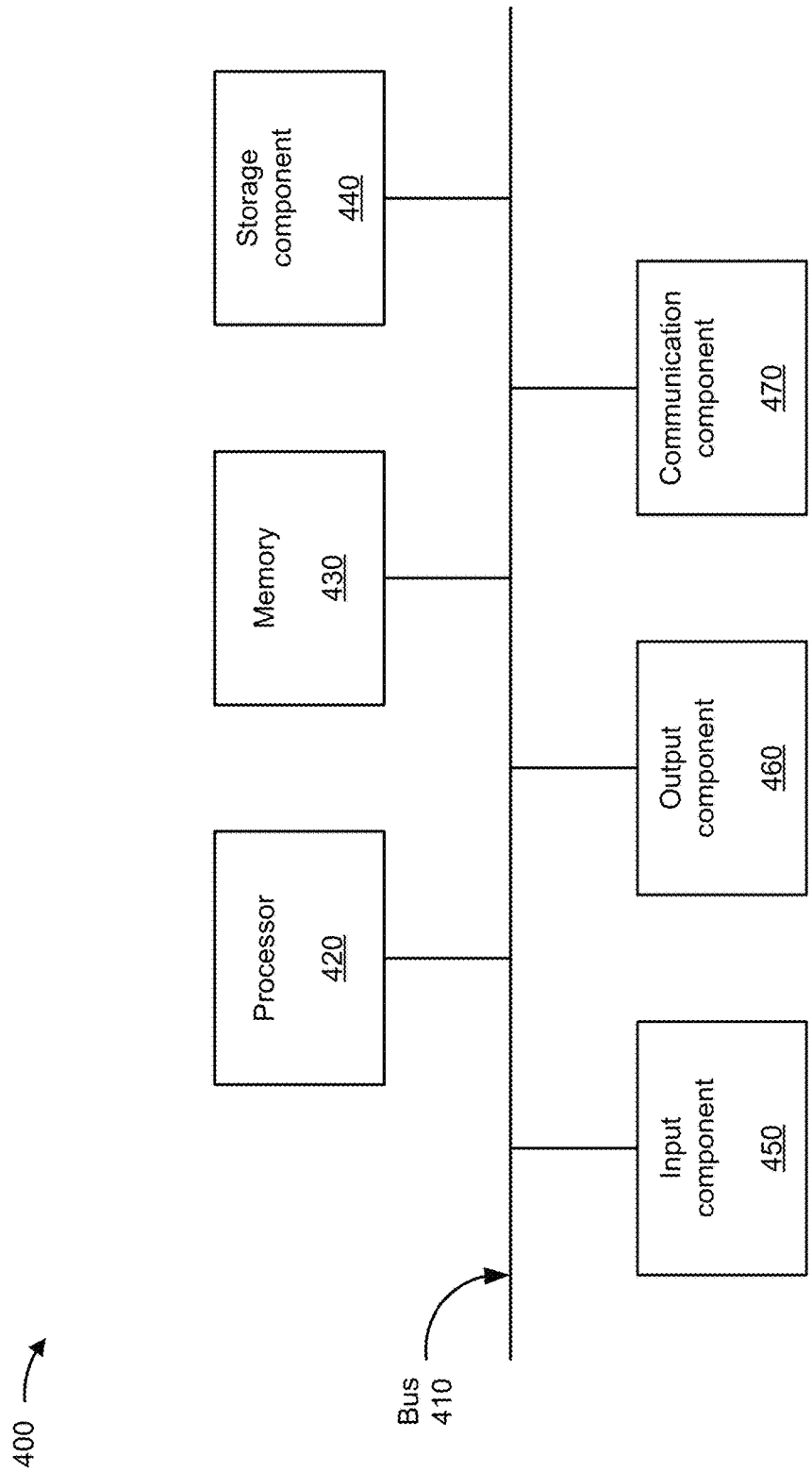

FIG. 4 is a diagram of example components of a device 400, which may correspond to endpoint device 210, customer edge device 220, provider edge device 230, and/or network device 240. In some implementations, endpoint device 210, customer edge device 220, provider edge device 230, and/or network device 240 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
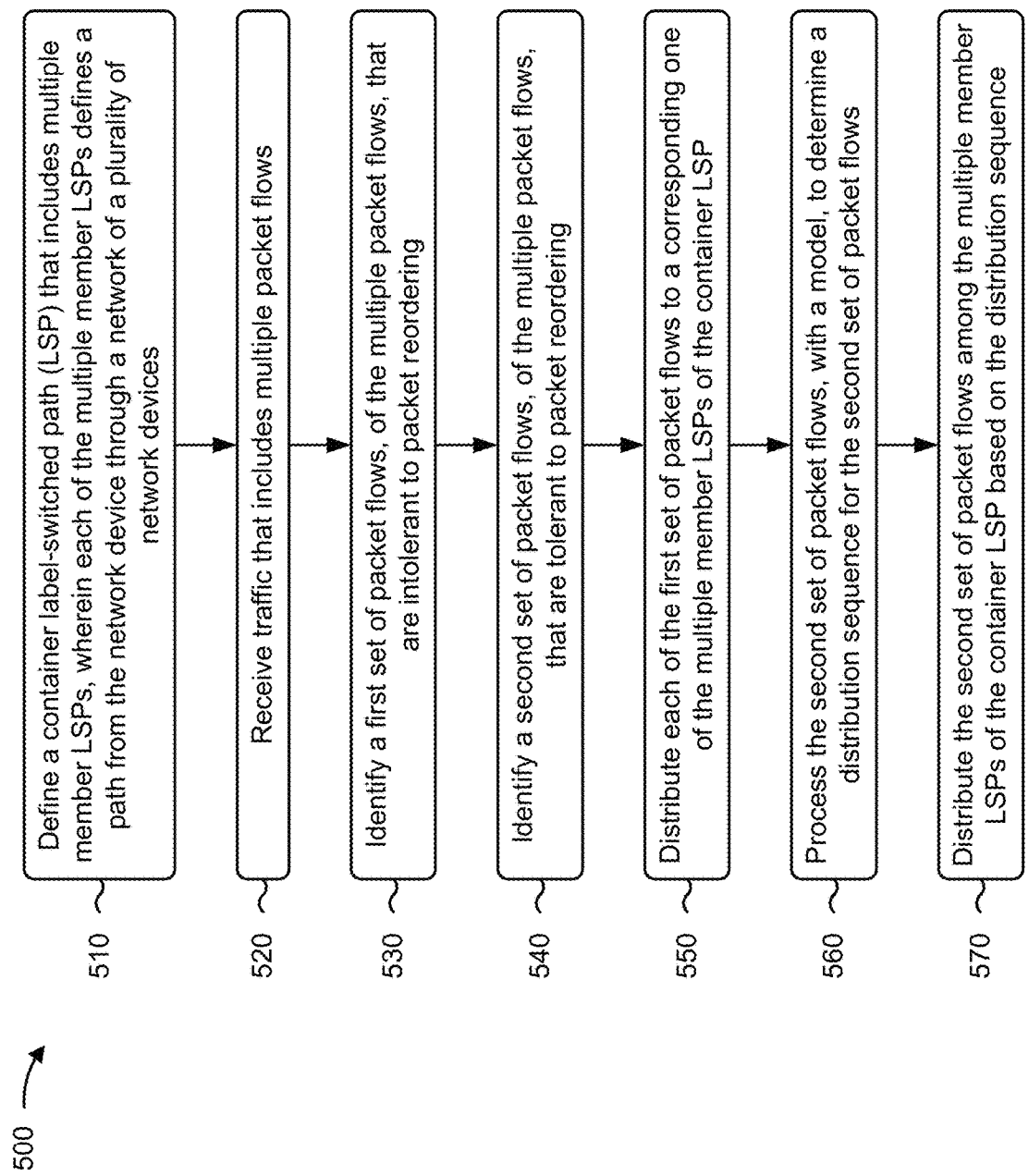
FIG. 5 is a flow chart of an example process relating to interspersing network traffic across members of a container label-switched path.

FIG. 5 is a flowchart of an example process 500 associated with interspersing network traffic across members of a container label-switched path. In some implementations, one or more process blocks of FIG. 5 may be performed by a network device (e.g., provider edge device 230). In some implementations, one or more process blocks of FIG. 5 may be performed by another device or a group of devices separate from or including the network device, such as an endpoint device (e.g., endpoint device 210), a customer edge device (e.g., customer edge device 220), a network device (e.g., network device 240), and/or the like. Additionally, or alternatively, one or more process blocks of FIG. 5 may be performed by one or more components of device 300 and/or device 400, such as input component 310, switching component 320, output component 330, controller 340, processor 420, memory 430, storage component 440, input component 450, output component 460, and/or communication component 470.

As shown in FIG. 5, process 500 may include defining a container label-switched path (LSP) that includes multiple member LSPs, wherein each of the multiple member LSPs defines a path from the network device through a network of a plurality of network devices (block 510). For example, the network device may define a container label-switched path (LSP) that includes multiple member LSPs, as described above.

In some implementations, each of the multiple member LSPs defines a path from the network device through a network of a plurality of network devices. In some implementations, one or more of the multiple member LSPs include different bandwidths and/or different network devices of the plurality of network devices.

As further shown in FIG. 5, process 500 may include receiving traffic that includes multiple packet flows (block 520). For example, the network device may receive traffic that includes multiple packet flows, as described above.

As further shown in FIG. 5, process 500 may include identifying a first set of packet flows, of the multiple packet flows, that are intolerant to packet reordering (block 530). For example, the network device may identify a first set of packet flows, of the multiple packet flows, that are intolerant to packet reordering, as described above. The first set of packet flows may include packet flows associated with a voice call.

In some implementations, when identifying the first set of packet flows, the network device may analyze headers of the multiple packet flows; and may identify the first set of packet flows, of the multiple packet flows, that are intolerant to packet reordering based on analyzing the headers of the multiple packet flows.

As further shown in FIG. 5, process 500 may include identifying a second set of packet flows, of the multiple packet flows, that are tolerant to packet reordering (block 540). For example, the network device may identify a second set of packet flows, of the multiple packet flows, that are tolerant to packet reordering, as described above.

In some implementations, identifying the first set of packet flows, of the multiple packet flows, that are intolerant to packet reordering comprises analyzing headers of the multiple packet flows, and identifying the first set of packet flows, of the multiple packet flows, that are intolerant to packet reordering based on analyzing the headers of the multiple packet flows.

As further shown in FIG. 5, process 500 may include distributing each of the first set of packet flows to a corresponding one of the multiple member LSPs of the container LSP (block 550). For example, the network device may distribute each of the first set of packet flows to a corresponding one of the multiple member LSPs of the container LSP, as described above. Distributing each of the first set of packet flows to the corresponding one of the multiple member LSPs of the container LSP may prevent packet reordering for the first set of packet flows and may prevent the first set of packet flows from being split between two or more of the multiple member LSPs. Alternatively, and/or additionally, distributing each of the first set of packet flows to the corresponding one of the multiple member LSPs of the container LSP may prevent one or more of load balancing, hash polarization, signal overhead, or packet reordering.

In some implementations, distributing each of the first set of packet flows to the corresponding one of the multiple member LSPs of the container LSP comprises utilizing a portion of the multiple member LSPs to distribute each of the first set of packet flows to the corresponding one of the multiple member LSPs, and utilizing a remaining portion of the multiple member LSPs to distribute one or more packet flows, of the second set of packet flows, among the multiple member LSPs.

As further shown in FIG. 5, process 500 may include processing the second set of packet flows, with a model, to determine a distribution sequence for the second set of packet flows (block 560). For example, the network device may process the second set of packet flows, with a model, to determine a distribution sequence for the second set of packet flows, as described above.

When processing the second set of packet flows, with the model, to determine the distribution sequence for the second set of packet flows, the network device may determine a linear vector based on bandwidths of the multiple member LSPs, normalize the linear vector to generate a normalized linear vector, determine a distribution vector based on an mth norm of the normalized linear vector, determine that an element of the distribution vector is greater than or equal to a normalized average packet length of the second set of packet flows, and utilize the distribution vector to determine the distribution sequence when the element of the distribution vector is greater than or equal to the normalized average packet length. In some implementations, the distribution sequence may be based on a deficit round robin method.

In some implementations, determining the distribution vector comprises determining the distribution vector based on the normalized linear vector comprises incrementally determining norm values of the distribution vector until the element of the distribution vector is greater than or equal to the normalized average packet length.

As further shown in FIG. 5, process 500 may include distributing the second set of packet flows among the multiple member LSPs of the container LSP based on the distribution sequence (block 570). For example, the network device may distribute the second set of packet flows among the multiple member LSPs of the container LSP based on the distribution sequence, as described above. Distributing the second set of packet flows among the multiple member LSPs of the container LSP based on the distribution sequence may prevent automatic bandwidth adjustments for the container LSP.

In some implementations, the network device may receive a third set of packet flows that are intolerant to packet reordering; may distribute each of the third set of packet flows to another corresponding one of the multiple member LSPs of the container LSP; may reprocess the second set of packet flows, with the model, to determine another distribution sequence for the second set of packet flows; and may distribute the second set of packet flows among the multiple member LSPs of the container LSP based on the other distribution sequence.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   defining, by a network device, a container label-switched path (LSP) that includes multiple member LSPs,
     wherein each of the multiple member LSPs defines a path from the network device through a network of a plurality of network devices;
   receiving, by the network device, traffic that includes multiple packet flows;
   identifying, by the network device, a first set of packet flows, of the multiple packet flows, that are intolerant to packet reordering, wherein identifying the first set of packet flows, of the multiple packet flows, that are intolerant to packet reordering comprises:
analyzing headers of the multiple packet flows; and
identifying the first set of packet flows that are intolerant to packet reordering based on analyzing the headers of the multiple packet flows;
identifying, by the network device, a second set of packet flows, of the multiple packet flows, that are tolerant to packet reordering;
distributing, by the network device, each of the first set of packet flows to a corresponding one of the multiple member LSPs of the container LSP;
processing, by the network device, the second set of packet flows, with a model, to determine a distribution sequence for the second set of packet flows; and
distributing, by the network device, the second set of packet flows among the multiple member LSPs of the container LSP based on the distribution sequence.

2. The method of claim 1, wherein processing the second set of packet flows, with the model, to determine the distribution sequence for the second set of packet flows comprises:
determining a linear vector based on bandwidths of the multiple member LSPs;
normalizing the linear vector to generate a normalized linear vector;
determining a distribution vector based on a mth norm of the normalized linear vector, wherein m is an integer greater than zero;
determining that an element of the distribution vector is greater than or equal to a normalized average packet length of the second set of packet flows; and
utilizing the distribution vector to determine the distribution sequence when the element of the distribution vector is greater than or equal to the normalized average packet length.

3. The method of claim 2, wherein determining the distribution vector based on the normalized linear vector comprises:
incrementally determining norm values of the distribution vector until the element of the distribution vector is greater than or equal to the normalized average packet length.

4. The method of claim 1, wherein distributing each of the first set of packet flows to the corresponding one of the multiple member LSPs of the container LSP prevents packet reordering for the first set of packet flows and prevents the first set of packet flows from being split between two or more of the multiple member LSPs.

5. The method of claim 1, wherein distributing each of the first set of packet flows to the corresponding one of the multiple member LSPs of the container LSP comprises:
utilizing a portion of the multiple member LSPs to distribute each of the first set of packet flows to the corresponding one of the multiple member LSPs; and
utilizing a remaining portion of the multiple member LSPs to distribute one or more packet flows, of the second set of packet flows, among the multiple member LSPs.

6. The method of claim 1, wherein the distribution sequence is based on a deficit round robin method.

7. The method of claim 1, further comprising:
receiving a third set of packet flows that are intolerant to packet reordering;
distributing each of the third set of packet flows to another corresponding one of the multiple member LSPs of the container LSP;
reprocessing the second set of packet flows, with the model, to determine another distribution sequence for the second set of packet flows; and
distributing the second set of packet flows among the multiple member LSPs of the container LSP based on the other distribution sequence.

8. A network device, comprising:
one or more memories; and
one or more processors configured to:
define a container label-switched path (LSP) that includes multiple member LSPs, wherein each of the multiple member LSPs defines a path from the network device through a network of a plurality of network devices;
receive traffic that includes multiple packet flows;
analyze headers of the multiple packet flows;
identify a first set of packet flows, of the multiple packet flows, that are intolerant to packet reordering based on analyzing the headers of the multiple packet flows;
identify a second set of packet flows, of the multiple packet flows, that are tolerant to packet reordering based on analyzing the headers of the multiple packet flows;
distribute each of the first set of packet flows to a corresponding one of the multiple member LSPs of the container LSP,
wherein the one or more processors, to distribute each of the first set of packet flows to the corresponding one of the multiple member LSPs of the container LSP, are to:
utilize a portion of the multiple member LSPs to distribute each of the first set of packet flows to the corresponding one of the multiple member LSPs, and
utilize a remaining portion of the multiple member LSPs to distribute one or more packet flows, of the second set of packet flows, among the multiple member LSPs;
process the second set of packet flows, with a model, to determine a distribution sequence for the second set of packet flows; and
distribute the second set of packet flows among the multiple member LSPs of the container LSP based on the distribution sequence.

9. The network device of claim 8, wherein the one or more processors are further configured to:
receive a third set of packet flows that are intolerant to packet reordering;
distribute each of the third set of packet flows to another corresponding one of the multiple member LSPs of the container LSP;
reprocess the second set of packet flows, with the model, to determine another distribution sequence for the second set of packet flows; and
distribute the second set of packet flows among the multiple member LSPs of the container LSP based on the other distribution sequence.

10. The network device of claim 8, wherein the first set of packet flows include packet flows associated with a voice call.

11. The network device of claim 8, wherein distributing each of the first set of packet flows to the corresponding one of the multiple member LSPs of the container LSP prevents one or more of:
  load balancing,
  hash polarization,
  signal overhead, or
  packet reordering.

12. The network device of claim 8, wherein distributing the second set of packet flows among the multiple member LSPs of the container LSP based on the distribution sequence prevents automatic bandwidth adjustments for the container LSP.

13. The network device of claim 8, wherein one or more of the multiple member LSPs include different bandwidths.

14. The network device of claim 8, wherein one or more of the multiple member LSPs include different network devices of the plurality of network devices.

15. A non-transitory computer-readable medium storing instructions, the instructions comprising:
  one or more instructions that, when executed by one or more processors of a network device, cause the one or more processors to:
    define a container label-switched path (LSP) that includes multiple member LSPs,
      wherein each of the multiple member LSPs defines a path from the network device through a network of a plurality of network devices;
    receive traffic that includes multiple packet flows;
    identify a first set of packet flows, of the multiple packet flows, that are intolerant to packet reordering;
    identify a second set of packet flows, of the multiple packet flows, that are tolerant to packet reordering;
    distribute each of the first set of packet flows to a corresponding one of the multiple member LSPs of the container LSP;
    determine a linear vector based on bandwidths of the multiple member LSPs;
    normalize the linear vector to generate a normalized linear vector;
    determine a distribution vector based on a mth norm of the normalized linear vector,
      wherein m is an integer greater than zero;
    determine that an element of the distribution vector is greater than or equal to a normalized average packet length of the second set of packet flows;
    utilize the distribution vector to determine a distribution sequence when the element of the distribution vector is greater than or equal to the normalized average packet length; and
    distribute the second set of packet flows among the multiple member LSPs of the container LSP based on the distribution sequence.

16. The non-transitory computer-readable medium of claim 15, wherein the one or more instructions, that cause the one or more processors to determine the distribution vector based on the normalized linear vector, cause the one or more processors to:
  incrementally determine norm values of the distribution vector until the element of the distribution vector is greater than or equal to the normalized average packet length.

17. The non-transitory computer-readable medium of claim 15, wherein distributing each of the first set of packet flows to the corresponding one of the multiple member LSPs of the container LSP prevents packet reordering for the first set of packet flows and prevents the first set of packet flows from being split between two or more of the multiple member LSPs.

18. The non-transitory computer-readable medium of claim 15, wherein the one or more instructions, that cause the one or more processors to distribute each of the first set of packet flows to the corresponding one of the multiple member LSPs of the container LSP, cause the one or more processors to:
  utilize a portion of the multiple member LSPs to distribute each of the first set of packet flows to the corresponding one of the multiple member LSPs; and
  utilize a remaining portion of the multiple member LSPs to distribute one or more packet flows, of the second set of packet flows, among the multiple member LSPs.

19. The non-transitory computer-readable medium of claim 15, wherein the one or more instructions, that cause the one or more processors to identify the first set of packet flows, of the multiple packet flows, that are intolerant to packet reordering, cause the one or more processors to:
  analyze headers of the multiple packet flows; and
  identify the first set of packet flows, of the multiple packet flows, that are intolerant to packet reordering based on analyzing the headers of the multiple packet flows.

20. The non-transitory computer-readable medium of claim 15, wherein the one or more instructions, when executed by the one or more processors, further cause the one or more processors to:
  receive a third set of packet flows that are intolerant to packet reordering;
  distribute each of the third set of packet flows to another corresponding one of the multiple member LSPs of the container LSP;
  reprocess the second set of packet flows, with a model, to determine another distribution sequence for the second set of packet flows; and
  distribute the second set of packet flows among the multiple member LSPs of the container LSP based on the other distribution sequence.

* * * * *